June 13, 1967   C. C. GILLET   3,325,719
BRIDGE TYPE STATIC INVERTER
Filed July 15, 1963   2 Sheets-Sheet 1
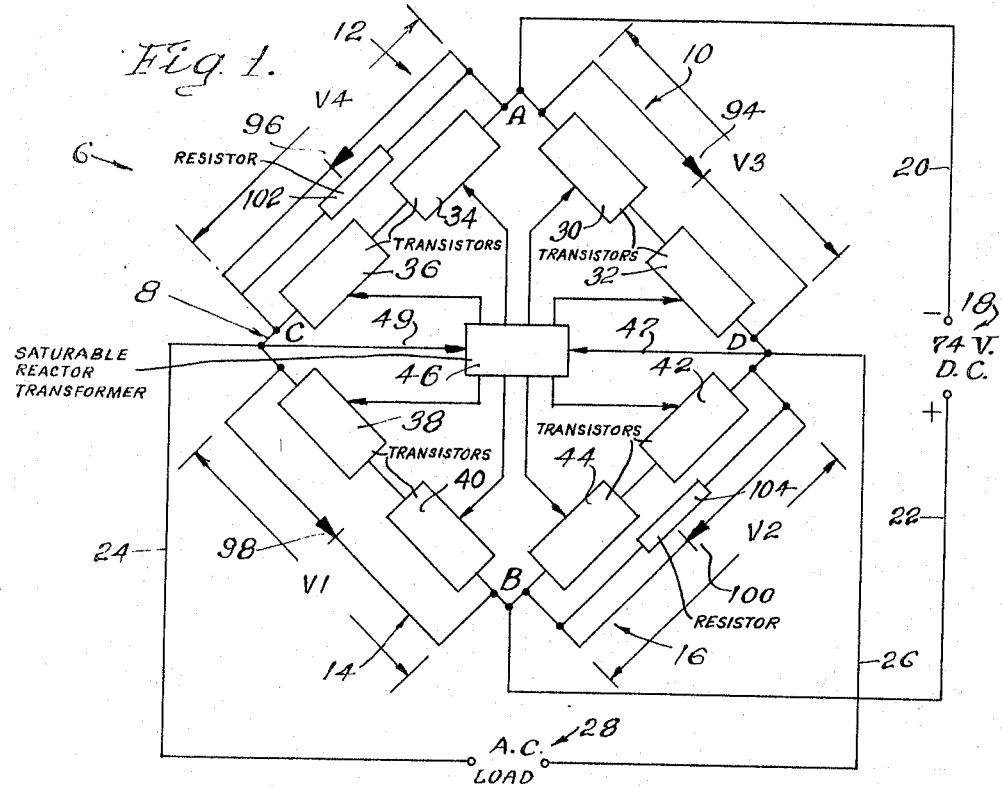
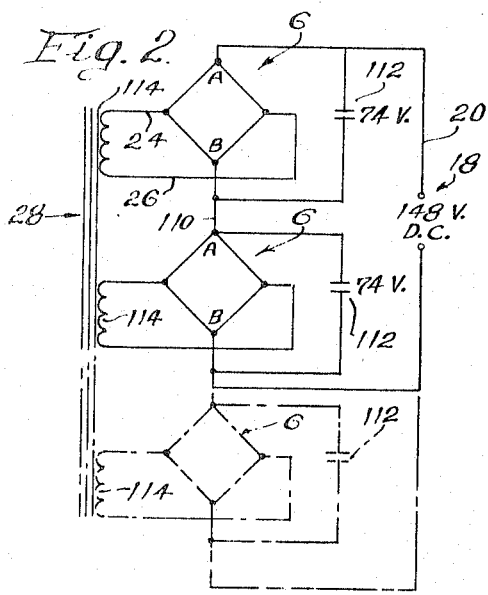
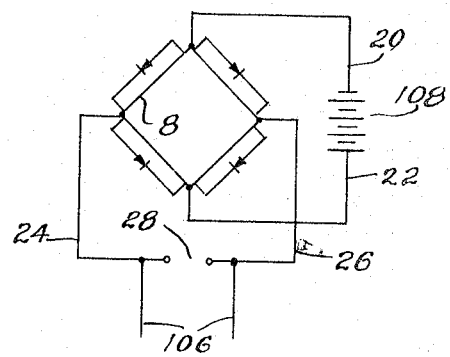
Inventor:
Charles C. Gillet
By [signature]
Atty.

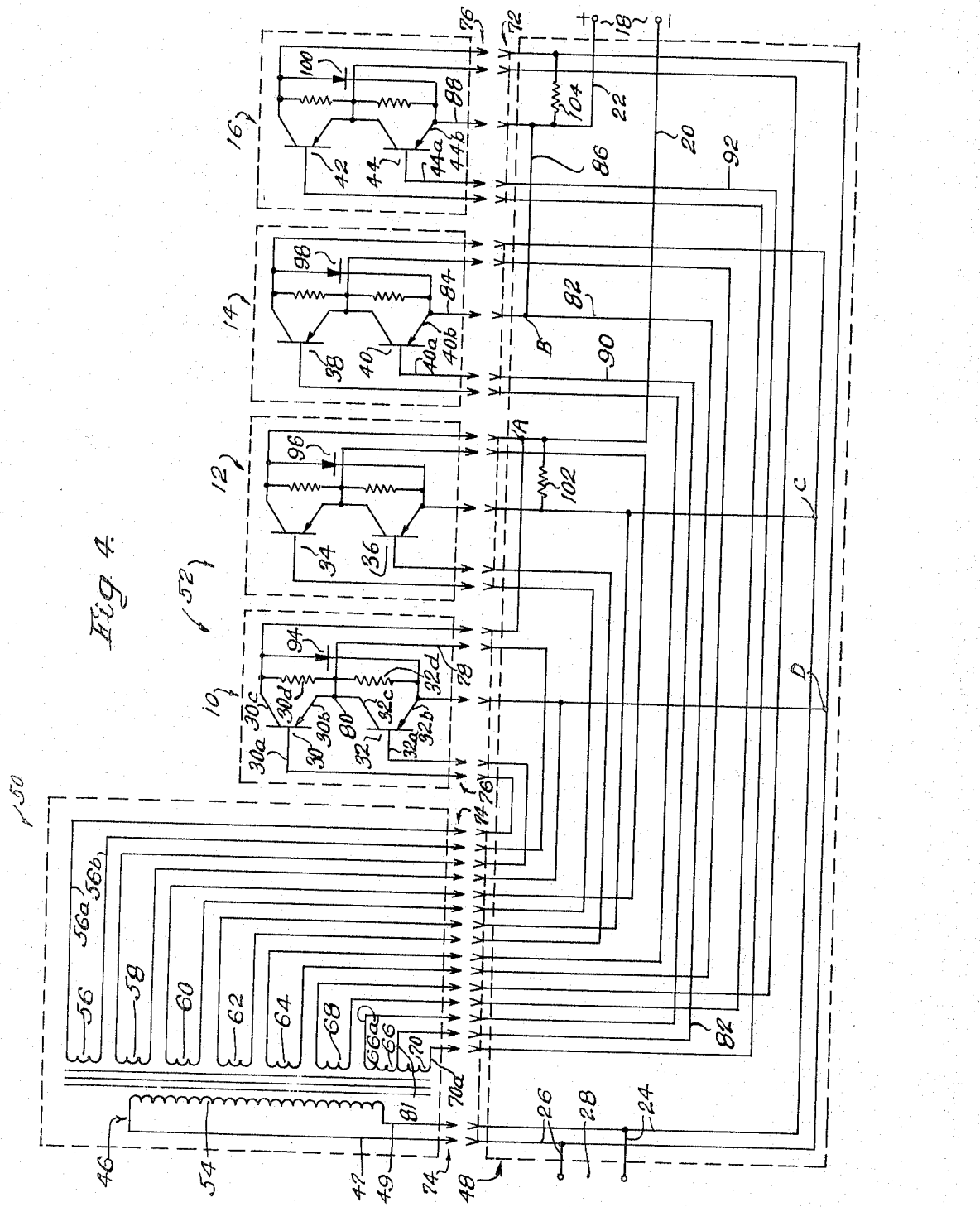

United States Patent Office 3,325,719
Patented June 13, 1967

3,325,719
BRIDGE TYPE STATIC INVERTER
Charles C. Gillet, Skokie, Ill., assignor to Vapor Corporation, Chicago, Ill., a corporation of Delaware
Filed July 15, 1963, Ser. No. 295,085
5 Claims. (Cl. 321—45)

The present invention relates to a static inverter.

A broad obbject of the invention is to provide a novel static inverter that is relatively unaffected by the power factor of the load to which power is supplied.

Another object of the invention is to provide a static inverter that will accommodate much higher voltage requirements than inverters heretofore known, and which is extremely frequency stable, and further which can be very readily regulated.

Another object of the invention is to provide a static inverter which is especially adaptable to incorporation with one or more additional such inverters without the requirement for synchronization, within a wide range of variation of frequencies, whereby to provide greater capacity than a single one of such inverters.

A still further object is to provide a static inverter of the general character disclosed above, which is adapttable to use as a stand-by inverter, in the event of failure of a normal A.C. source, and which is capable of recharging the D.C. battery source upon re-establishment of the regular A.C. source.

Aonther object of the invention is to provide a static inverter of the general character referred to above, utilizing a novel Wheatstone bridge arrangement including a plurality of transistors in each leg, thereby enabling the use of lower voltage transistors than heretofore was the case, with great advantages in economy.

Other objects and advantages of the invention will appear from the following detailed description taken in conjunction with the accompanying drawings in which:

FIG. 1 is a block diagram of the bridge circuit utilized in the inverter;

FIG. 2 is a diagrammatic arrangement of a plurality of the inverters in conjoint use;

FIG. 3 is a diagram of certain of the elements of the inverter, in conjunction with a normal A.C. source, demonstrating the use of the device as a stand-by inverter and battery charger; and FIG. 4 is a circuit diagram of the elements utilized in the bridge arrangement of FIG. 1.

Referring in detail to the drawings, attention is directed first to FIG. 1, constituting a block diagram of the electrical arrangement utilized in the in inverter, the inverter as a whole being indicated at 6 and a bridge at 8. This bridge includes legs 10, 12, 14 and 16, having input junctions A and B, and center junctions C and D. A D.C. source is indicated at 18, which may be a battery or generator, as will be understood. The use of a battery will be significant in connection with the use of the apparatus in re-charging the battery, as referred to hereinbelow. Circuit means connects the D.C. source 18 with the bridge through conductors 20 and 22, connected respectively with input junctions A and B. Other circuit means connects the bridge with the load, including conductors 24 and 26 connected at center junctions C and D of the bridge respectively, and lead to the A.C. load indicated at 28.

Each of the legs of the bridge arrangement includes a plurality of transistors, in this case two, in series arrangement in each leg, in a circuit connection arrangement described in detail hereinbelow. These transistors, for purposes of convenience, are identified individually by numbers 30, 32, 34, 36, 38, 40, 42 and 44. The various electrical elements, while indicated by block conformations or other configurations in FIG. 1 are illustrated in FIG. 4 in electrical signification.

A saturable reactor transformer 46 is utilized in the bridge arrangement, FIG. 1 indicating the general relation thereof with other elements, and FIG. 4 showing the detail electrical connection therewith. In FIG. 4, the transformer 46 is indicated at the left, and the various transistors at the right. The various electrical elements utilized in the arrangement are shown in FIG. 4, as incorporated in separate self-contained components, namely 48, 50, and 52, respectively, each including a container enclosing the respective elements therein, and having connector elements exposed to the exterior for connection with corresponding counterpart connector elements in the other components. The component 48 may be referred to as a base component which includes mainly wiring, and is utilized for supporting the other components. The component 50 includes the transformer, and is detachably connected with the base component, the arrangement being such that the component 50 may be replaced selectively by any of a number of other similar components, setting up, for example, different frequencies. There are a plurality of components 52, each including one of the legs of the bridge, and each in itself a self-contained unit which includes the corresponding two transistors and associated elements enclosed in a casing, and external connector elements for connection with corresponding connector elements in the base component 48.

The saturable reactor transformer 46, as shown in FIG. 4 includes a primary winding 54, and eight secondary windings 56, 58, 60, 62, 64, 66, 68 and 70 respectively, each being associated with one of the transistors. The bottom two secondaries 66, 70 are physically formed of one coil with a center tap, the two portions of this coil being connected to the corresponding input terminals of the legs 14 and 16 through a common lead-in wire from the D.C. source, eliminating an external connector element in the component 50. The secondaries of the transformer are connected respectively with the transistors in accordance with the sequence of numerals applied thereto, i.e., secondary 56 is associated with the transistor 30, secondary 58 with transistor 32, etc. The external connector elements in the base component 48 are indicated generally at 72, those in the transformer component 50 at 74 and those in the transistor components or leg components 52 at 76.

The two transistors of each leg, for example, transistors 30 and 32 in leg 10, are connected in series. The transistors are operated in a common emitter configuration, i.e., the input terminals of the transistors are base-emitter and the output terminals are collector-emitter. For example, referring to transistor 30 in leg 10 (FIG. 4) the base connector lead is indicated at 30a, the emitter lead at 30b and the collector lead at 30c. The secondary 56 of the transformer 46, for example, is connected with the corresponding transistor 30 by one conductor 56a connected with the base lead 30a, and the other conductor 56b connected with conductor 78 which leads to a juncture 80 forming a common connection between the emitter lead 30b and the collector lead 32c of the transistor 32. The connections between the other secondaries and associated transistors can be readily traced from the example given in connection with the transistor 30. However, it is desirable to refer specially to the connection between the secondaries 66 and 70, forming portions of a common coil with a center tap, with their respective transistors. The conductor 81, which forms the center tap of these coils, connects with a conductor 82 in the base component 48, which connects with a conductor 84 in the transistor 40 of the leg 14. This conductor 84 also connects with the emitter lead 40b. Leading from the conductor 82 is another conductor 86, which connects with the lead-in conductor 22 from the D.C. source 18, the latter also connecting with conductor 88 in the transistor 44 in the leg 16. The conductor 88 connects with emitter lead 44b. The return from the respective transistors to the coils 66, 70 is as follows: from transistor 40 through base lead 40a to conductor 90 in the base component 48, and from the latter to the conductor 66a leading to the secondary 66; the connections from the transistor 44 are base lead 44a, conductor 92 in the base component 48 to conductor 70a of the secondary 70.

The input junctions A and B and the center junctions C and D of the bridge arrangement of FIG. 1, as will be noted, are also indicated in the circuit diagram in the base component 48 of FIG. 4.

Voltage dividers are incorporated in each leg in order to assure even division of the voltage drop across the series transistors therein, i.e., between the emitter and collector leads is a resistor 30d, 32d, etc., identified with the letter d applied to the reference numeral of the corresponding transistor. The value of these resistors is such that the current therethrough is on the order of ten times the leakage current through the transistors in "OFF" state.

Also associated with the transistors in each of the legs, in the preferred form of the invention, are diode rectifiers 94, 96, 98 and 100 respectively. These rectifiers are connected parallel with the series transistors in the respective legs, and are arranged for conducting current in opposition to the direction of D.C. through the bridge from the source 18. This arrangement will be described in detail hereinbelow, and is utilized in the use of the apparatus as a stand-by unit and battery charger.

For the purpose of establishing an unbalanced condition in the bridge arrangement, additional resistors are connected in shunt across each of one pair of opposite legs, namely, resistor 102 is connected across leg 12, while resistor 104 is connected across the opposite leg 16, these resistors being shown in both FIGS. 1 and 4.

In the operation of the inverter, as D.C. power is applied, a small current begins to flow in each branch of the bridge, but due to the unbalance caused by the resistors 102 and 104, the main current flow is from junction B through leg 14 to junction C, then through conductor 49 to the primary 54 of the transformer, then conductor 47 to junction D; the current then is through leg 10 to junction A and in return to the D.C. source 18. The current thus produced in the secondaries imposes control signals on the corresponding transistors, and, as will be noted, the connections of the respective secondaries to the transistors are such that the signals so produced are of such polarities as to render, in the case given, the transistors in the legs 14 and 10 conducting, while rendering the transistors in the other two legs non-conducting.

Upon saturation of the transformer core, the flow of current in the secondary ceases, the lull occurring before saturation, producing the flat top portion of the square wave. Build-up and decay of the flux produces current flows in the secondaries in the opposite directions, producing signals of respectively opposite polarities. These latter signals then render the legs 12 and 16 conducting, while rendering the other legs 10 and 14 non-conducting. This change in the conducting conditions of the respective legs results in flow of D.C. in the opposite direction through its circuit and through the primary as follows: from the D.C. source 18 through conductor 22 to junction B, through leg 16 to junction D and then through conductor 47 to the primary 54; it then flows through conductor 49 to junction C, and continues through leg 12 to junction A and then through conductor 20 to the D.C. source.

The flow of the D.C. in this latter direction through the primary during this decay-to-saturation step continues without cessation into the next succeeding decay-to-saturation step; these decay-to-saturation steps are repeated twice per cycle; during one decay-to-saturation step, the D.C. flows in one direction, and then during the next decay-to-saturation step it flows in the opposite direction. Thus each decaying and the next succeeding saturating step together form one-half of an A.C. cycle, and two such decaying-saturating steps form one full A.C. cycle. The reverse flow of D.C. in the decaying step advances or speeds up the decaying action.

The D.C. flow in opposite directions just referred to results in corresponding directions of flow of the A.C. as follows: in the first direction of the flow of D.C. mentioned, the A.C. flows from the transformer through the conductor 47 and then conductor 26, and after passing through the load the current continues through conductors 24 and 49 to the transformer; in the second direction of the flow of D.C. mentioned, the A.C. flows from the transformer through the conductors 49 and 24 to the load, and in return from the load through conductors 26 and 47 to the transformer.

An important feature of the invention is its adaptability to loads having a lagging power factor. In the case of previously known inverters, such lagging power factor could not be accommodated universally by all inverters; heretofore, an inverter could accommodate the lagging power factor of only an individual load after the characteristics of that load had been determined and the inverter specifically designed therefor. The inverter of this invention is universal in that it will accommodate the lagging power factor of any load (up to the volt-ampere rating of the inverter). This facility is provided by the rectifiers 94, 96, 98 and 100 which, as will be noted from the diagram of FIG. 1, are arranged in opposition to the normal flow of the D.C. current in the inverting operation. In the case of a load having a lagging power factor, e.g., the load is inductive, the change in current during switching causes a back EMF to be generated by the load inductance. This back EMF tends to maintain the current constant, and in the direction it existed before switching. However, in the use of transistors, the transistors in their "ON" state do not permit of reverse flow of current therethrough. Whenever the back EMF rises to a value greater than the source, the current flow caused by that back EMF tends to follow through the leakage paths of the transistors, but due to the characteristics of the transistors, this reverse flow is prevented up to a certain value, and beyond that value, damage may result to the transistors. In such case, the rectifiers 94, 96, 98 and 100 enable the flow of current from the load to the source in by-passing relation to the transistors and, of course, without damaging or impairing the transistors. This arrangement therefore prevents damage to the bridge arrangement which otherwise may not be prevented.

This novel arrangement of inverter with the rectifiers 94, 96, 98 and 100 used as a standby unit has the still further advantage that the inverter can be utilized as a charger for the battery that is used in such standby arrangement. In the use of the apparatus as a standby device, the normal source of current would be the usual A.C. source, such as a line current. In the event of failure of the normal A.C. source, the D.C. battery and inverter apparatus would be connected to the load. This arrangement is illustrated in FIG. 3, where the bridge arrangement and D.C. and A.C. circuit means are shown in barest representation. This illustration includes the bridge 8 proper, the rectifiers 94, 96, 98 and 100, the D.C. conductors 20 and 22, the A.C. conductors 24 and 26, and the load 28. Also included in this illustration is an A.C. source 106, having conductors respectively connected with the conductors 24 and 26 across the load. The D.C. source, or battery, is shown at 108. Upon such failure of the normal A.C. source 106 as indicated, the battery 108 provides the source of power and the A.C. is applied to the load therefrom, through the inverter, in the manner described above. After re-establishment of the A.C. source 106, the battery 108 is relieved of applying the load and it is re-charged from the normal A.C. source 106 by the reverse current through the circuit containing the rectifiers 94, 96, 98 and 100, in the manner described above in connection with the reverse current from the load having the lagging power factor; thus the apparatus can be maintained as a standby source indefinitely.

The inverter of this invention is also capable of effective use with one or more additional inverters. Such an arrangement is illustrated in FIG. 2. A plurality of inverters 6, in this case two, are connected in series with a common D.C. source 18. The conductors from this source, as indicated above, are identified at 20 and 22, and are connected respectively with junction A of one inverter and junction B of the other inverter. A common conductor 110 interconnects junction B of the one inverter and junction A of the second. Across each of the inverters is a capacitor 112. The A.C. output circuit of the inverters are connected with the A.C. load indicated in this case also at 28. In the present instance, the load may take the form of a transformer having a primary coil 114 of each inverter, to which may be coupled, for example, appropriate secondary coil or coils.

An advantage of the present arrangement is that greater capacity can be accommodated, and the provision of a desired output voltage less than that of the source. For example, a D.C. voltage of 74 volts was utilized as the example in the main description of the invention, and this same voltage is developed at the A.C. output. If, for example, the desired voltage is inaccessible, but a greater voltage which, as indicated in FIG. 2, is 148 volts D.C., this voltage is divided by the capacitors 112 to half of that value, and this voltage, which is identical with that assumed as the desired voltage in connection with FIG. 1, is developed at the A.C. output 28, or transformer coils 114. This same voltage is, of course, developed in each of the transformer primary coils for the different inverters. The dot-dash configuration of a third inverter in FIG. 2 indicates that any desired number of inverters may be used in this arrangement, and the source voltage is divided according to the number utilized, as for example, in the case of three inverters the output voltage of each would be one-third of the input voltage of 148 volts or 49 plus volts.

In the use of a plurality of such inverters in this arrangement, it is not necessary to synchronize the cyclic frequency of the various ones. A variation of considerable range can be accommodated, such, for example, as in the neighborhood of 10%. The lack of perfect synchronization is accommodated by the fact that one of them may determine the frequency of commutation, and when it reaches saturation sooner than the others, and the decay of saturation begins, this triggers the remaining transformers so that those remaining ones assume a decaying condition immediately. This action advances or speeds up the decaying action of the first transformer, without any bucking effect as between the several transformers.

Another practical advantage of the arrangement of this inverter is that the base component 48 mechanically serves as the means for supporting the other components 50 and 52. This base component may be in the form of a box or can with the connector elements 72 exposed to the exterior thereof. The component 50 also is a self-contained component, having the transformer entirely contained within an outer casing or can. This component may be put in place merely by plugging in the respective connectors 74 thereof with the corresponding connectors 72 in the base component 48. The same is true with respect to the components 52, which include the transistors and each constitutes a leg of the bridge. The arrangement thus referred to renders the device more practical in enabling selection of various components. For example, if it should be desired to change the frequency from 60 cycles to 50 or some other figure, the transformer component 50 then in place is removed and another transformer having the desired characteristics is put in place. The same may be done in connection with the leg components 52, in which replacement components may contain transistors of other values.

While I have herein shown and described a preferred form of the invention, it will be understood changes may be made therein within the scope of the claims.

I claim:

1. Apparatus of the character disclosed operative as a static inverter and as a battery charger, comprising a bridge having a first and a second pair of opposite legs, input junctions at opposite points each between mutually adjacent legs, and center junctions at the other opposite points, each between mutually adjacent legs, the bridge including transistor means in each leg thereof, a D.C. battery source and circuit means connected therewith having lines connected respectively with said input junctions of the bridge, a saturable reactor transformer having a primary connected between said center junctions of the bridge, and a plurality of secondaries connected respectively with said transistor means and arranged for establishing such relative polarities as to provide opposite-polarity control signals on the transistor means respectively in mutually adjacent legs, the signals being respectively such as to render, alternately oppositely, both of one pair of opposite legs nonconducting, and both of the other pair of opposite legs conducting, in response to a portion of a cycle including decay and saturation of said saturable reactor, rectifier means connected across each leg in shunting relation to the transistor means and arranged for conducting D.C. through the legs in a direction opposite the D.C. in said source, circuit means having lines connected respectively with said center junctions of the bridge for transmitting A.C. to a load, and circuit means connected in said last named circuit means across the load for connection with an A.C. source whereby to render the foregoing apparatus effective as a stand-by D.C.-A.C. inverter, upon failure of said A.C. source and to enable recharging the D.C. battery source upon re-establishment of the A.C. source.

2. A static inverter comprising, a bridge having a first and a second pair of opposite legs, input junctions at opposite points each between mutually adjacent legs, and center junctions at the other opposite points each between mutually adjacent legs, the bridge including transistor means in each leg thereof, a D.C. source and circuit means connected therewith having lines connected respectively with said input junctions of the bridge, a saturable reactor transformer having a primary connected between said center junctions of the bridge, and a plurality of secondaries connected respectively with said transistor means and being arranged for establishing such relative polarities as to provide opposite-polarity control signals on the transistor means respectively in mutually adjacent legs, the signals being respectively such as to render, alternately oppositely, both of one pair of opposite legs non-conducting, and both of the other pair of opposite legs conducting, in response to a portion of a cycle including decay and saturation of said saturable reactor transformer, said saturable reactor transformer being detachably connected with the remainder of the inverter to enable selective connection of saturable reactor transformers having different frequencies, and circuit means having lines connected respectively with said center junctions of the bridge for transmitting A.C. to a load.

3. A static inverter comprising, a bridge having a first and a second pair of opposite legs, input junctions at opposite points each between mutually adjacent legs, and center junctions at the other opposite points each between mutually adjacent legs, the bridge including transistor means in each leg thereof, a D.C. source and circuit means connected therewith having lines connected respectively with said input junctions of the bridge, a saturable reactor transformer having a primary connected between said center junctions of the bridge, and a plurality of secondaries connected respectively with said transistor means and being arranged for establishing such relative polarities as to provide opposite-polarity control signals on the transistor means respectively in mutually adjacent legs, the signals being respectively such as to render, alternately oppositely, both of one pair of opposite legs non-conducting, and both of the other pair of opposite legs conducting, in response to a portion of a cycle including decay and saturation of said saturable reactor transformer, circuit means having lines connected respectively with said center junctions of the bridge for transmitting A.C. to a load, said inverter including a plurality of self-contained components each including a casing, and elements enclosed therein and portable therewith, said components including a first component having circuity enclosed therewithin and incorporating the circuit means for connection with the D.C. source and the A.C. load and also incorporating connector elements for connection with counterpart connector elements in the other components, a second component including said saturable reactor transformer and external connector elements therein, and a plurality of tertiary components, each including the elements of one of the legs of said bridge and also including external connector elements.

4. A static inverter comprising, a bridge having a first and a second pair of opposite legs, input junctions at opposite points each between mutually adjacent legs, and center junctions at the other opposite points each between mutually adjacent legs, the bridge including transistor means in each leg thereof, a D.C. source and circuit means connected therewith having lines connected respectively with said input junctions of the bridge, rectifier means connected across each leg in shunting relation to the transistor means therein and arranged for conducting D.C. in a direction opposite to the D.C. in said source, a resistor connected across each of only one pair of opposite legs in shunting relation to the transistor means therein, a saturable reactor transformer having a primary connected between said center junctions of the bridge, and a plurality of secondaries including one connected across the base-emitter terminals of each said transistor means and being arranged for establishing such relative polarities as to provide opposite-polarity control signals on the transistor means respectively in mutually adjacent legs, the signals being respectively such as to render, alternately oppositely, both of one pair of opposite legs non-conducting, and both of the other pair of opposite legs conducting, in response to a portion of a cycle including decay and saturation of said saturable reactor transformer, and circuit means having lines connected respectively with said center junctions of the bridge for transmitting A.C. to a load.

5. The invention set out in claim 4, wherein each leg includes a plurality of transistors in series relationship, and a resistor associated with each transistor connected across the emitter-collector terminals thereof of such a value that the current therethrough is large relative to the leakage current of the transistors in the "off" state.

References Cited

UNITED STATES PATENTS

| | | |
|---|---|---|
| 2,990,517 | 6/1961 | Grieg. |
| 3,044,023 | 7/1962 | Floyd. |
| 3,059,191 | 10/1962 | Hierholzer et al. |
| 3,074,030 | 1/1963 | Hierholzer _____ 321—45 X |
| 3,098,200 | 7/1963 | Jensen _____ 331—113 |
| 3,119,057 | 1/1964 | Wilson _____ __321—45 X |
| 3,141,110 | 7/1964 | Corry. |
| 3,238,445 | 3/1966 | Sikorra _____ 321—45 X |

JOHN F. COUCH, *Primary Examiner.*

W. M. SHOOP, *Assistant Examiner.*